(12) United States Patent
    Gobara

(10) Patent No.: US 11,343,649 B2
(45) Date of Patent: May 24, 2022

(54) MOBILE TERMINAL, SEMICONDUCTOR IC, AND CONTROL METHOD

(71) Applicant: SEIKO EPSON CORPORATION, Tokyo (JP)

(72) Inventor: Naoki Gobara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/082,733

(22) Filed: Oct. 28, 2020

(65) Prior Publication Data

US 2021/0136530 A1    May 6, 2021

(30) Foreign Application Priority Data

Oct. 30, 2019    (JP) .............................. JP2019-197246

(51) Int. Cl.
    *H04W 4/029*    (2018.01)
    *H04L 1/18*     (2006.01)
    *H04W 4/02*     (2018.01)

(52) U.S. Cl.
    CPC ............... *H04W 4/029* (2018.02); *H04L 1/18* (2013.01); *H04W 4/027* (2013.01)

(58) Field of Classification Search
    None
    See application file for complete search history.

(56) References Cited

U.S. PATENT DOCUMENTS

| 9,270,329 B2 | 2/2016 | Sellier et al. |
| 2020/0229206 A1* | 7/2020 | Badic ................... H04W 4/023 |
| 2021/0160810 A1* | 5/2021 | Zhang .................... G01S 19/48 |

FOREIGN PATENT DOCUMENTS

JP    2015534740 A    12/2015

* cited by examiner

*Primary Examiner* — Adolf Dsouza
(74) *Attorney, Agent, or Firm* — Chip Law Group

(57) ABSTRACT

A mobile terminal having a second communication device performing Sigfox communication, which is a wireless communication standard such that an acknowledgement is not sent back even when data is received, includes: a specifying unit specifying a state of the mobile terminal; a determination unit determining whether the state specified by the specifying unit satisfies a predetermined condition or not; and a communication control unit starting Sigfox communication using the second communication device, when the determination unit determines that the predetermined condition is satisfied.

8 Claims, 4 Drawing Sheets

|  | DISTANCE | NUMBER OF BASE STATIONS | MOVING SPEED |
|---|---|---|---|
| FIRST CONDITION | 500m OR LESS | 1 OR MORE | 60km/h OR LESS |
| SECOND CONDITION | 1km OR LESS | 2 OR MORE | 30km/h OR LESS |
| THIRD CONDITION | 2km OR LESS | 3 OR MORE | 10km/h OR LESS |
| FOURTH CONDITION | 4km OR LESS | 5 OR MORE | 5km/h OR LESS |

MOBILE TERMINAL, SEMICONDUCTOR IC, AND CONTROL METHOD

The present application is based on, and claims priority from JP Application Serial Number 2019-197246, filed Oct. 30, 2019, the disclosure of which is hereby incorporated by reference herein in its entirety.

BACKGROUND

1. Technical Field

The present disclosure relates to a mobile terminal, a semiconductor IC, and a control method.

2. Related Art

Recently, various communication techniques of ultra-low power consumption, as opposed to high-speed communication such as 4G, have been proposed as communication techniques for communication in which a large number of communication devices periodically transmit a small amount of data, as in communication in a sensor network. Sigfox communication disclosed in JP-T-2015-534740 is an example of the communication techniques of ultra-low power consumption.

In Sigfox communication, even when data is received, an acknowledgement ACK or the like is not sent back. Therefore, even when the receiving side does not correctly receive data transmitted via Sigfox communication, retransmission of the data is not carried out. When a mobile terminal transmits data via Sigfox communication to a base station, whether the communication is successful or not depends on the distance between the mobile terminal and the base station or the state of the mobile terminal such as whether the mobile terminal is moving or not. When the mobile terminal transmits data to the base station despite the state where Sigfox communication is not successful such as where the state of the mobile terminal does not satisfy a predetermined condition, there is a problem in that the electric power already stored in the battery of the mobile terminal is wasted.

SUMMARY

A mobile terminal according to an aspect of the present disclosure has a communication module communicating according to a wireless communication standard such that an acknowledgement is not sent back even when data is received, and includes: a specifying unit specifying a state of the mobile terminal; a determination unit determining whether the state specified by the specifying unit satisfies a predetermined condition or not; and a communication control unit starting communication using the communication module, when the determination unit determines that the predetermined condition is satisfied.

A semiconductor IC according to another aspect of the present disclosure controls a communication module communicating according to a wireless communication standard such that an acknowledgement is not sent back even when data is received, and includes: a specifying unit specifying a state of a communication device having the communication module; a determination unit determining whether the state specified by the specifying unit satisfies a predetermined condition or not; and a communication control unit starting communication using the communication module, when the determination unit determines that the predetermined condition is satisfied.

A control method according to still another aspect of the present disclosure is a control method for a communication module communicating according to a wireless communication standard such that an acknowledgement is not sent back even when data is received, including: specifying a state of a communication device having the communication module, determining whether the specified state satisfies a predetermined condition or not, and starting communication using the communication module, when it is determined that the predetermined condition is satisfied.

DESCRIPTION OF EXEMPLARY EMBODIMENTS

An embodiment will now be described with reference to the drawings. The embodiment described below includes the description of various technically preferable limitations. However, the embodiment of the present disclosure is not limited to these forms.

1. Embodiment

Figure 1:
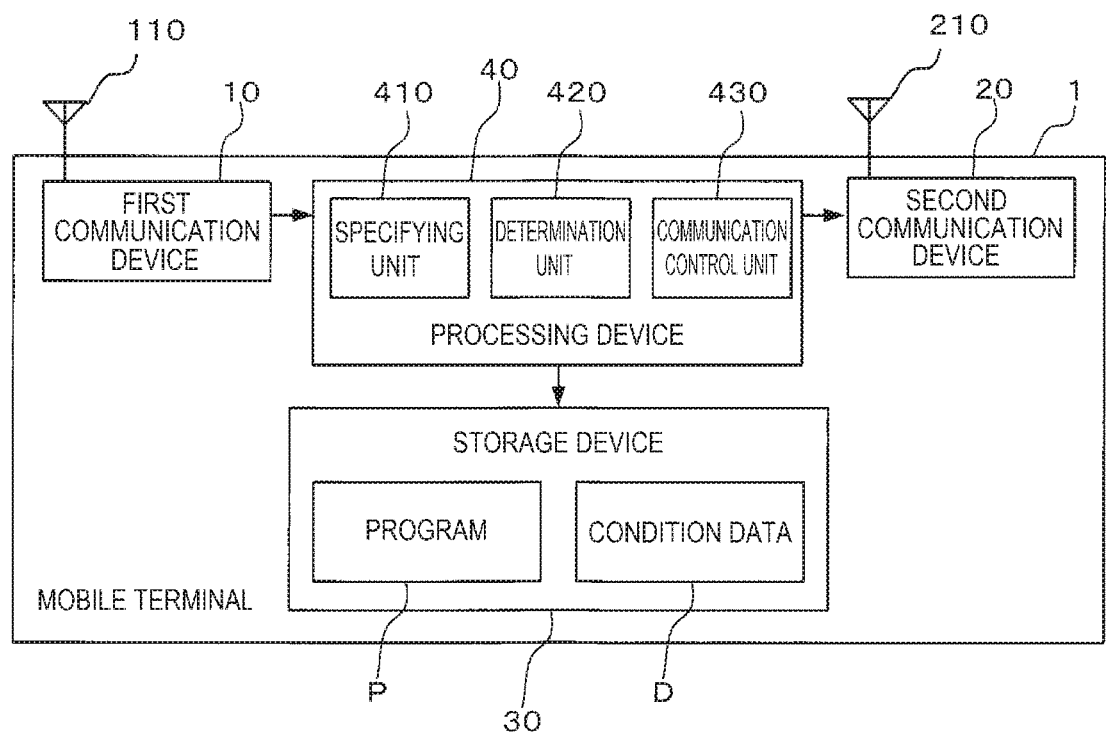
FIG. 1 is a block diagram showing an example of the electrical configuration of a mobile terminal 1 according to an embodiment of the present disclosure.

FIG. 1 is a block diagram showing an example of the electrical configuration of a mobile terminal 1 according to an embodiment of the present disclosure. The mobile terminal 1 has the function of receiving a signal transmitted from a GPS (Global Positioning System) satellite and specifying the position of the mobile terminal 1, based on the received signal. In this embodiment, the position of the mobile terminal 1 is specified, based on a signal transmitted from a GPS satellite. However, the position of the mobile terminal 1 may be specified, based on a signal transmitted from a GNSS (Global Navigation Satellite System) satellite. In the description below, specifying a position based on a signal transmitted from a GPS satellite or a GNSS satellite is referred to as positioning.

The mobile terminal 1 has the function of performing communication of ultra-low power consumption with a base station. More specifically, the mobile terminal 1 has the function of performing Sigfox communication with a base station. In FIG. 1, the base station performing Sigfox communication with the mobile terminal 1 is not illustrated. The mobile terminal 1 is configured to periodically execute the processing of transmitting position information representing a position specified by positioning to the base station via Sigfox communication at a predetermined time interval T, for example, at an interval of 5 minutes or the like. The mobile terminal 1 according to this embodiment is a communication device configured to be attached to clothes like a badge or emblem. Attaching the mobile terminal 1 to clothes or the like of a child enables accumulation of a history of position information in a server device installed at a base station and thus enables provision of a position monitoring service for the child with the mobile terminal 1 attached to his or her clothes or the like. In this embodiment, the case where the mobile terminal 1 is attached to clothes or the like of a child is described. However, the mobile terminal 1 may be attached to clothes or the like of an elderly person or to a collar or the like of a pet such as a dog or cat.

FIG. 1 is a block diagram showing an example of the electrical configuration of the mobile terminal 1. As shown in FIG. 1, the mobile terminal 1 has a first communication device 10, a second communication device 20, a storage device 30, and a processing device 40. Although a detailed illustration is omitted in FIG. 1, the mobile terminal 1 has a battery supplying operating power to each of the first communication device 10, the second communication device 20, the storage device 30, and the processing device 40.

Although a detailed illustration is omitted in FIG. 1, the first communication device 10 and the second communication device 20 are coupled to the processing device 40 via a UART, SPI, or I2C or similar interface. The first communication device 10 is a positioning module receiving a signal transmitted from a GPS satellite and performing positioning based on the received signal, under the control of the processing device 40. An existing technology may be used for the positioning based on the signal transmitted from the GPS satellite. An antenna 110 receiving the signal transmitted from the GPS satellite is coupled to the first communication device 10. The first communication device 10 supplies position information representing a position specified by the positioning to the processing device 40 via the interface.

The second communication device 20 is a communication module performing Sigfox communication with a base station, under the control of the processing device 40. An antenna 210 for transmitting data to the base station via Sigfox communication is coupled to the second communication device 20. The second communication device 20 transmits the position information supplied from the processing device 40 via the interface, to the base station via Sigfox communication.

Figure 2:
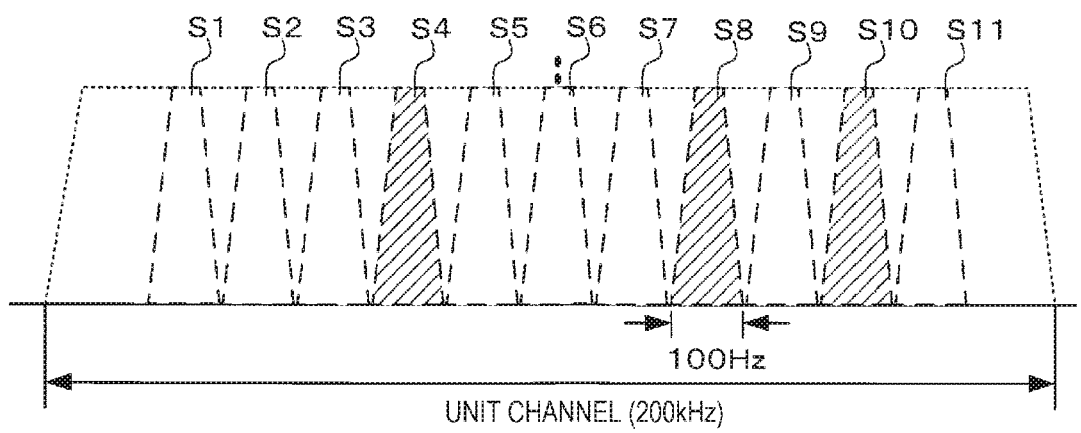
FIG. 2 shows an outline of Sigfox communication.
Figure 3:
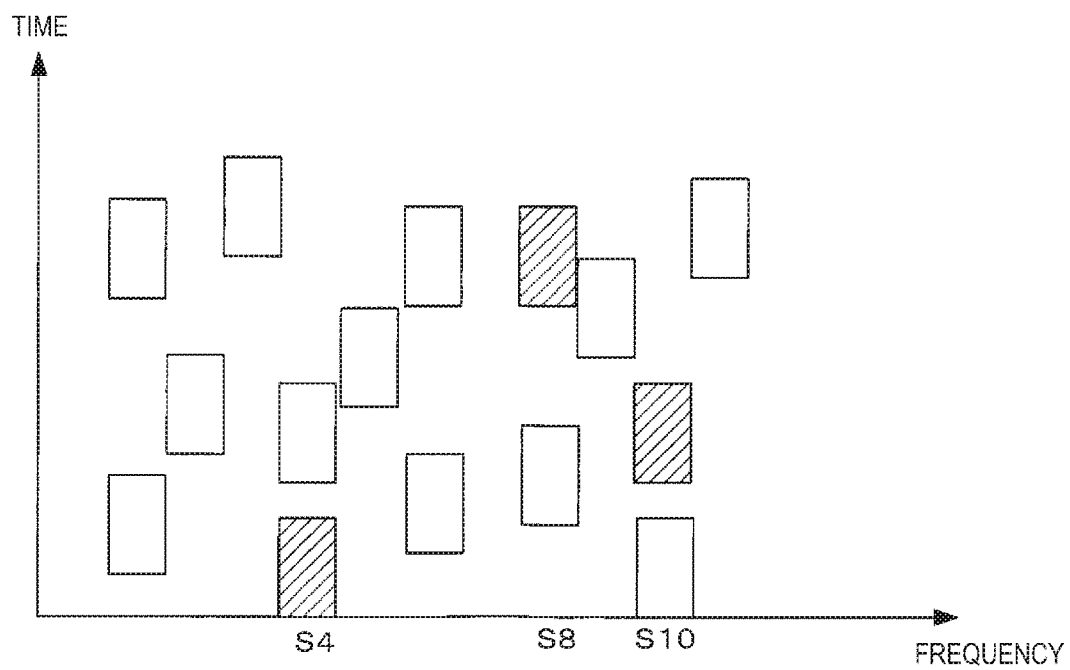
FIG. 3 shows an outline of Sigfox communication.

FIGS. 2 and 3 show an outline of Sigfox communication. Sigfox communication is specialized in communication in which a large number of communication devices periodically transmit a small amount of data, as in communication in a sensor network. In Japan, the upper limit of the amount of data transmitted in one round of Sigfox communication is 12 bytes, and the upper limit of the number of times of communication per day is 140 times. The communication method in Sigfox communication is wireless communication with a bandwidth of 100 Hz. In Sigfox communication in Japan, a 920-MHz band is used and each Sigfox communication device randomly transmits a signal with a 100-Hz bandwidth within a unit channel with a 200-kHz bandwidth, as shown in FIG. 2. In FIG. 2, signals S1 to S11 are illustrated from among a large number of signals included in the unit channel with the 200-kHz bandwidth. The signal S6 in FIG. 2 is a signal having a center frequency of the unit channel with the 200-kHz bandwidth. Communicating a signal with the narrow band of 100 Hz results in higher spectral density and higher resistance to interference.

The Sigfox communication device transmits one piece of data three times consecutively, using signals with different frequencies from each other. In FIGS. 2 and 3, the hatched parts represent signals used by the mobile terminal 1 to transmit position information to the base station. In the example shown in FIGS. 2 and 3, the mobile terminal 1 first transmits the position information to the base station, using the signal S4, then transmits the position information to the base station, using the signal S10, and then transmits the position information to the base station, using the signal S8. The operation of transmitting one piece of data three time consecutively using signals with different frequencies from each other is referred to as time diversity and frequency diversity. The data reaches the base station unless all of the receptions of the data transmitted three times consecutively end up in failure. Also, the data transmitted from the Sigfox communication device is received by all the base stations that can receive the signal data. This is referred to as space diversity. With space diversity, even when there is an interference source between one base station and the Sigfox communication device and the communication between this base station and the Sigfox communication device is obstructed by the interference source, the reception by the other base stations can complement the communication.

As described above, in Sigfox communication, the base station does not send back an acknowledgement even when the base station receives data. Therefore, the mobile terminal 1, which is the data transmission source, can detect the completion of data transmission but cannot determine whether the data has been correctly received by the base station or not. Also, in Sigfox communication, the communication module does not perform signal synchronization with the base station prior to data transmission. Therefore, communication may not be able to be carried out when the frequency of a signal reaching the base station and the frequency of a signal that can be received by the base station are very different from each other. When the mobile terminal 1 equipped with the communication module is moving, the frequency of a signal reaching the base station may change due to the influence of the Doppler effect and the base station may not be able to receive the signal.

The outline of Sigfox communication has been described.

The storage device 30 has a ROM (read-only memory) and a RAM (random-access memory). In the storage device 30, a program P for causing the processing device 40 to execute the control method according to the present disclosure is already stored. Also, in the storage device 30, condition data D representing a predetermined condition for causing the processing device 40 to determine whether the state of the mobile terminal 1 is a state where the probability of success in Sigfox communication with the base station is high or not, is already stored. As described above, when the mobile terminal 1 is moving, due to the influence of the Doppler effect, the probability of success in Sigfox communication becomes lower as the moving speed of the mobile terminal 1 becomes higher. Therefore, in this embodiment, the condition data D representing a speed threshold about the moving speed of the mobile terminal 1 is already stored in the storage device 30. In this embodiment, the speed threshold is set to 30 kilometers per hour. This speed threshold is an example of a first threshold according the present disclosure.

The processing device 40 includes a processor such as a CPU (central processing unit). The processing device 40 may be formed of a single processor or a plurality of processors. The processing device 40 may include the storage device 30. The processing device 40 may be integrated with one of the first communication device 10 and the second communication device 20. The processing device 40 executes the program P and thus functions as a control center controlling each part of the mobile terminal 1. The processing device 40 operating according to the program P functions as a specifying unit 410, a determination unit 420, and a communication control unit 430. The specifying unit 410, the determination unit 420, and the communication control unit 430 in this embodiment are software modules implemented by causing the processing device 40 to operate according to the program P.

The specifying unit 410 specifies the state of the mobile terminal 1. In this embodiment, the specifying unit 410 specifies the moving speed of the mobile terminal 1 as the state of the mobile terminal 1, based on position information supplied from the first communication device 10. More specifically, the specifying unit 410 acquires position information from the first communication device 10 at a predetermined time interval, divides an amount of change in position represented by two pieces of position information that are acquired consecutively, by the predetermined time interval, thus specifies the moving speed of the mobile terminal 1. The determination unit 420 determines whether the state specified by the specifying unit 410 satisfies a predetermined condition or not. In this embodiment, the determination unit 420 determines whether the moving speed specified by the specifying unit 410 is equal to or lower than the speed threshold represented by the condition data D, or not. When the moving speed specified by the specifying unit 410 is equal to or lower than the speed threshold represented by the condition data D, the determination unit 420 determines that the predetermined condition is satisfied. When the moving speed is higher than the speed threshold, the determination unit 420 determines that the predetermined condition is not satisfied. When the determination unit 420 determines that the predetermined condition is satisfied, the communication control unit 430 starts communication using the second communication device 20. In this embodiment, when the moving speed specified by the specifying unit 410 is determined as equal to or lower than the speed threshold, the communication control unit 430 supplies the position information supplied from the first communication device 10, to the second communication device 20, and causes the second communication device 20 to transmit the position information to the base station via Sigfox communication.

Figure 4:
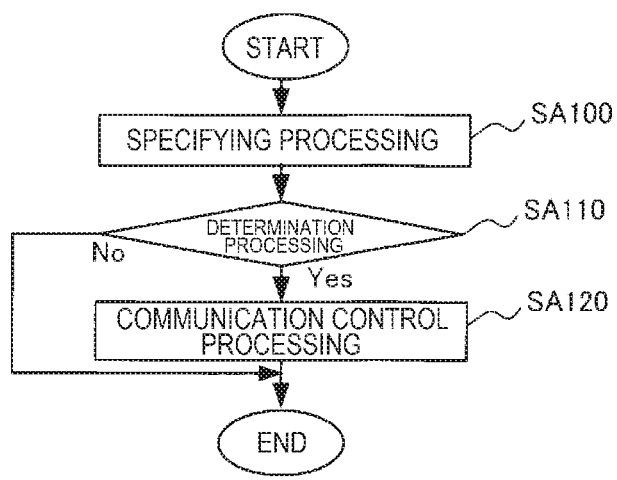
FIG. 4 is a flowchart showing a flow of a control method executed by a processing device 40 of the mobile terminal 1 according to a program P.

By operating according to the program P, the processing device 40 executes a control method that conspicuously represents features of the present disclosure, periodically at a predetermined time interval T. FIG. 4 is a flowchart showing the flow of the control method executed by the processing device 40 according to the program P. As shown in FIG. 4, the control method in this embodiment includes specifying processing SA100, determination processing SA110, and communication control processing SA120.

In the specifying processing SA100, the processing device 40 functions as the specifying unit 410. In the specifying processing SA100, the processing device 40 specifies the state of the mobile terminal 1. In the determination processing SA110, the processing device 40 functions as the determination unit 420. In the determination processing SA110, the processing device 40 determines whether the state specified in the specifying processing SA100 satisfies a predetermined condition or not. When the result of the determination in the determination processing SA110 is "Yes", that is, when the state of the mobile terminal 1 specified in the specifying processing SA100 is determined as satisfying the predetermined condition, the processing device 40 executes the communication control processing SA120 and subsequently ends this control method. Meanwhile, when the result of the determination in the determination processing SA110 is "No", that is, when the state of the mobile terminal 1 specified in the specifying processing SA100 is determined as not satisfying the predetermined condition, the processing device 40 does not execute the communication control processing SA120, and destroys the position information specified in the specifying processing SA100 and ends this control method. That is, the communication control processing SA120 is executed only when the state of the mobile terminal 1 is determined as satisfying the predetermined condition. In the communication control processing SA120, the processing device 40 functions as the communication control unit 430. In the communication control processing SA120, the processing device 40 starts Sigfox communication using the second communication device 20. More specifically, in the communication control processing SA120, the processing device 40 supplies the position information acquired by the first communication device 10 to the second communication device 20 and starts Sigfox communication with the base station.

Figure 5:
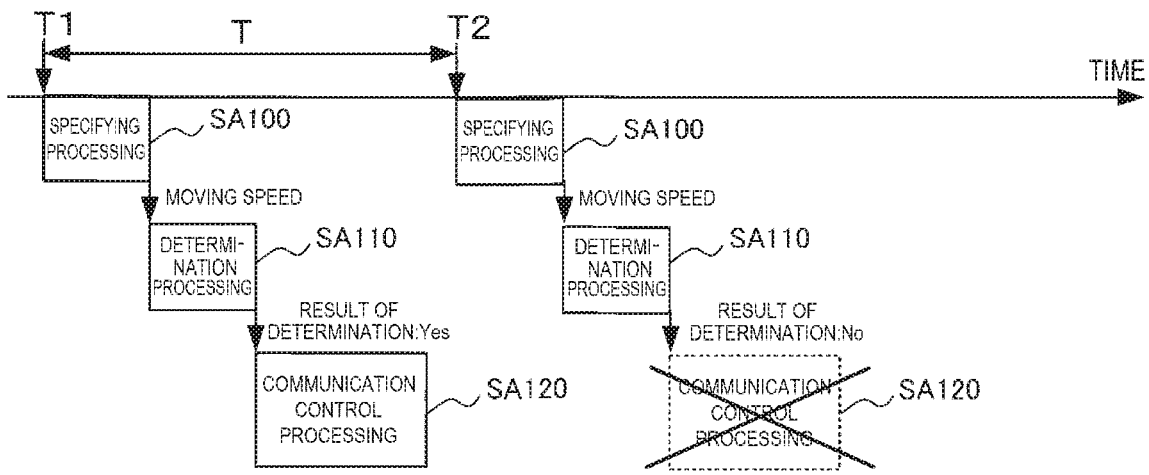
FIG. 5 explains an example of operation of the mobile terminal 1.

FIG. 5 shows an example of operation of the mobile terminal 1. In the specifying processing SA100 executed by the processing device 40 of the mobile terminal 1 at a transmission timing T1, it is assumed that a moving speed equal to or lower than the speed threshold is specified. In this case, the result of the determination in the determination processing SA110 is "Yes" and the communication control processing SA120 is executed. Consequently, position information representing the position of the mobile terminal 1 is transmitted to the base station via Sigfox communication. Meanwhile, in the specifying processing SA100 executed at a transmission timing T2, which is later than the transmission timing T1 by the predetermined time interval T, it is assumed that a moving speed higher than the speed threshold is specified. In this case, the result of the determination in the determination processing SA110 is "No" and the communication control processing SA120 is not executed.

In this way, in the mobile terminal 1 according to this embodiment, when the moving speed of the mobile terminal 1 is higher than the speed threshold at a timing of transmitting position information, that is, when the state of the mobile terminal 1 does not satisfy the predetermined condition, Sigfox communication is not started. As described above, when the moving speed of the mobile terminal 1 is higher than the speed threshold, the probability of failure in Sigfox communication with the base station is high, and if started, Sigfox communication is likely to be wasted. Therefore, this embodiment can avoid unnecessary communication by the mobile terminal 1 having the communication module communicating according to the wireless communication standard such that an acknowledgement is not sent back even when data is received, and can also avoid wasting the electric power already stored in the battery of the mobile terminal 1.

2. Modification Examples

The one embodiment of the present disclosure has been described so far. The following modifications may be suitably combined with the embodiment.

(1) The second communication device 20 in the embodiment is a communication module performing Sigfox communication with the base station. However, the second communication device 20 may be any communication module communicating according to a wireless communication standard such that an acknowledgement is not sent back even when data is received, and the wireless communication standard is not limited to Sigfox communication. The mobile terminal 1 in the embodiment is a communication device configured to be attachable to clothes like a badge or emblem. However, a smartphone, tablet terminal, or in-vehicle device or the like may be employed. The destination of transmission of the position information from the mobile terminal 1 is not limited to the base station and may be another mobile terminal.

(2) In the embodiment, when the result of the determination in the determination processing SA110 is "No", the position information specified in the specifying processing SA100 is destroyed. As the position information is destroyed in this way, the path taken by a monitoring target such as a child with the mobile terminal 1 attached to his or her clothes cannot be grasped. Thus, when the result of the determination in the determination processing SA110 is "No", time information representing the time when positioning is executed and position information acquired by the positioning may be stored in association with each other in the storage device 30, and the communication control unit 430 may execute the processing of transmitting the position information and time information to the base station at the point when the state of the mobile terminal 1 satisfies a predetermined condition. Specifically, when the result of the determination in the determination processing SA110 is "Yes" at a transmission timing next to a transmission timing when the result of the determination in the determination processing SA110 is "No", the communication control unit 430 may execute the processing of transmitting the position information and time information stored in the storage device 30 in addition to the result of the positioning at this next transmission timing, to the base station.

Figure 6:
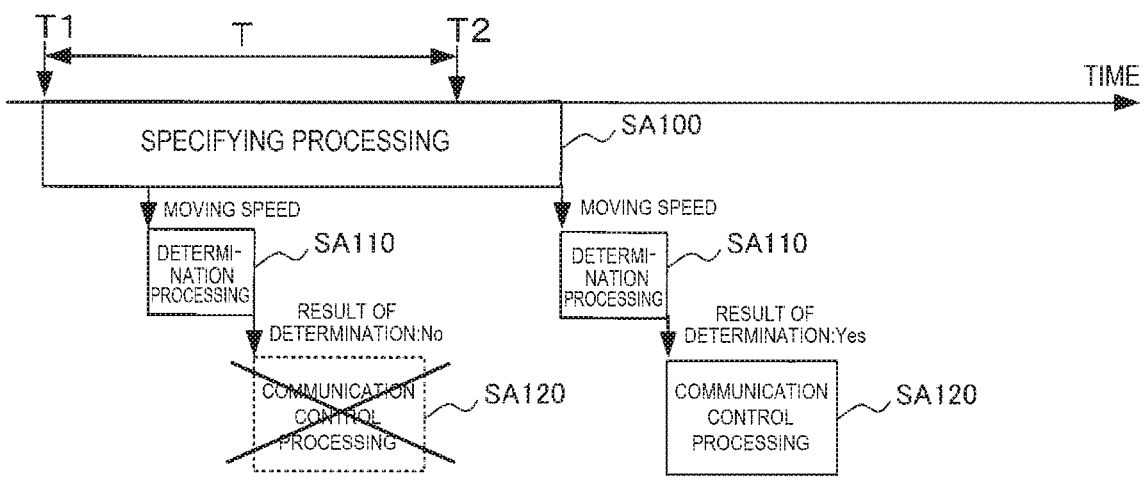
FIG. 6 explains a modification example (2).

The combination of time information and position information stored in the storage device 30 is not limited to one combination and may be a plurality of combinations, depending on the storage capacity of the storage device 30. In the case where a plurality of combinations of time information and position information are stored in the storage device 30, the communication control unit 430 may execute transmission to the base station when it is determined that all the combinations of time information and position information stored in the storage device 30 can be transmitted. When transmitting a plurality of combinations of the time information and position information, the specifying processing SA100 may continue to be executed over a plurality of transmission timings so as to constantly monitor the moving speed of the mobile terminal 1 over the plurality of transmission timings, as shown in FIG. 6.

(3) In the embodiment, the position information acquired by positioning is transmitted from the mobile terminal 1 to the base station. However, the data transmitted from the mobile terminal 1 to the base station is not limited to the position information. For example, a sound pickup device such as a microphone may be provided in the mobile terminal 1 and sound data representing a sound picked up by the sound pickup device may be transmitted from the mobile terminal 1 to the base station. Also, an image pickup device such as a camera may be provided in the mobile terminal 1 and image data representing an image picked up by the image pickup device may be transmitted from the mobile terminal 1 to the base station. Moreover, a temperature sensor may be provided in the mobile terminal 1 and temperature data representing a temperature measured by the temperature sensor may be transmitted from the mobile terminal 1 to the base station.

In the embodiment, the moving speed of the mobile terminal 1 is specified, based on the result of GPS positioning. However, a velocity sensor or an acceleration sensor may be provided in the mobile terminal 1 and the moving speed of the mobile terminal 1 may be specified, based on output data from the velocity sensor or the acceleration sensor. In a configuration where the data transmitted from the mobile terminal 1 to the base station is data other than the position information and where the moving speed of the mobile terminal 1 is specified, based on output data from the velocity sensor or the acceleration sensor, the mobile terminal 1 may not have the first communication device 10. That is, the first communication device 10 is not an essential component of the mobile terminal according to the present disclosure and can be omitted.

(4) In the embodiment, one type of speed threshold is used. However, different speed thresholds may be used according to the state of the mobile terminal 1 other than the moving speed. The state of the mobile terminal 1 other than the moving speed may be whether the location of the mobile terminal 1 is indoor or not, the distance between the mobile terminal 1 and the base station, or the number of base stations around the mobile terminal 1, or the like. With the same moving speed, the probability of success in communication is higher when the location of the mobile terminal 1 is outdoor than when the location of the mobile terminal 1 is indoor. A specific example of the predetermined condition where the state of the mobile terminal 1 includes whether the location of the mobile terminal 1 is indoor or not, may be that the location of the mobile terminal 1 is outdoor and that the moving speed is equal to or lower than a second threshold that is higher than the speed threshold in the embodiment.

When the base station is near the mobile terminal 1, basically, higher resistance to frequency deviation due to the Doppler effect is achieved and therefore the probability of success in Sigfox communication is higher even when the moving speed of the mobile terminal 1 is higher than the speed threshold in the embodiment. Therefore, when the state of the mobile terminal 1 includes the distance between the mobile terminal 1 and the base station, the speed threshold corresponding to when the distance between the mobile terminal 1 and the base station is long may be defined to be lower than the speed threshold corresponding to when the distance is short. Also, when the state of the mobile terminal 1 includes the distance between the mobile terminal 1 and the base station, the predetermined condition may be that the distance between the mobile terminal 1 and the base station is equal to or less than a third threshold and that the moving speed is equal to or lower than a fourth threshold that is higher than the speed threshold in the embodiment. When the state of the mobile terminal 1 includes the distance from the base station or the number of base stations around the mobile terminal 1, base station information representing the position of installation of each base station that can perform Sigfox communication with the mobile terminal 1 needs to be stored in advance in the storage device 30.

Figures 7, 8:
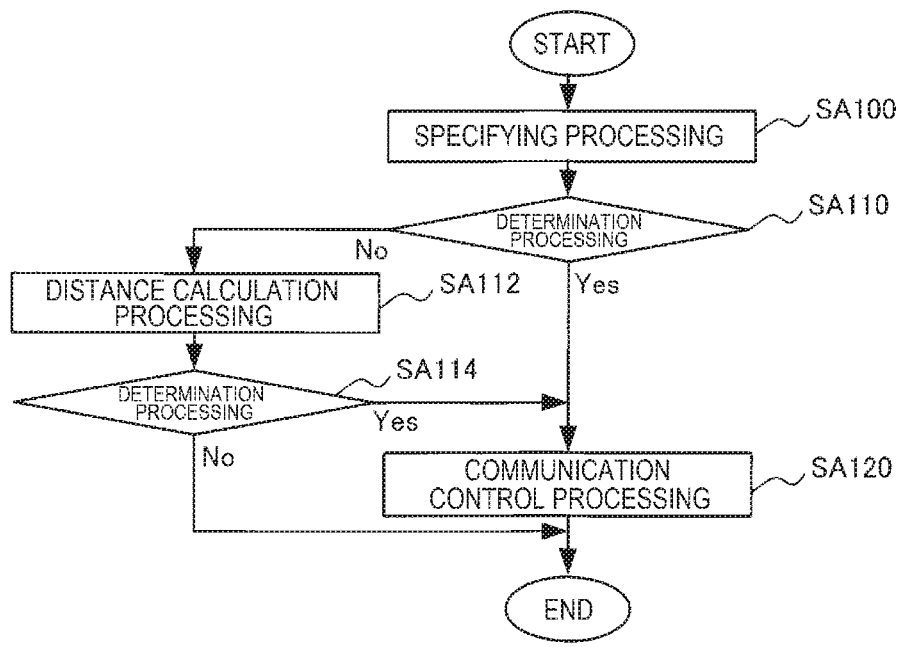
FIG. 7 is a flowchart showing a flow of a control method according to a modification example (4).
FIG. 8 shows an example of a condition table in the modification example (4).

When the state of the mobile terminal 1 includes the distance between the mobile terminal 1 and the base station, the processing device 40 may execute a control method shown in FIG. 7 instead of the control method shown in FIG. 4. As is clear from the comparison between FIG. 4 and FIG. 7, the control method in this modification example is different from the control method shown in FIG. 4 in that the control method in this modification example includes distance calculation processing SA112 and determination processing SA114. As shown in FIG. 7, the distance calculation processing SA112 and the determination processing SA114 are executed when the result of the determination in the determination processing SA110 is "No". In the distance calculation processing SA112, the processing device 40 calculates the distance between the nearest base station to the mobile terminal 1 and the mobile terminal 1, based on the base station information stored in the storage device and the position information acquired from the first communication device 10. In the determination processing SA114, the processing device 40 determines whether the distance calculated in the distance calculation processing SA112 is equal to or shorter than a distance threshold, or not.

When the result of the determination in the determination processing SA114 is "Yes", the processing device 40 executes the communication control processing SA120. When the result of the determination in the determination processing SA114 is "No", the processing device 40 ends this control method without executing the communication control processing SA120. According to the control method shown in FIG. 7, even where the moving speed of the mobile terminal 1 is higher than the first threshold, data transmission to the base station is executed when the distance between the nearest base station to the mobile terminal 1 and the mobile terminal 1 is equal to or less than the distance threshold. This is because, when the distance between the nearest base station to the mobile terminal 1 and the mobile terminal 1 is equal to or less than the distance threshold, the probability of success in communication with the base station is high even where the moving speed of the mobile terminal 1 is higher than the first threshold. Also, the state of the mobile terminal 1 may be only the distance between the mobile terminal 1 and the base station. Specifically, when the distance between the mobile terminal 1 and the base station is too far, communication with the base station may be not carried out regardless of the moving speed of the mobile terminal 1. This is because the probability of success in Sigfox communication becomes lower as the distance between the mobile terminal 1 and the base station becomes longer.

In a configuration where the state of the mobile terminal 1 includes the number of base stations around the mobile terminal 1, the predetermined condition may be that the number of base stations within a predetermined distance from the mobile terminal 1 is a predetermined number or more. Specifically, the condition data D representing a condition table shown in FIG. 8 may be stored in the storage device 30, and the processing device 40 may determine whether the state of the mobile terminal 1 satisfies a first condition or not. When the first condition is satisfied, the processing device 40 may start Sigfox communication. Meanwhile, when the first condition is not satisfied, the processing device 40 may execute the processing of determining whether a second condition is satisfied or not. The first condition in FIG. 8 is that one or more base stations are located within a range of 500 meters or less from the mobile terminal 1 and that the moving speed of the mobile terminal 1 is 60 kilometers per hour or less. The second condition in FIG. 8 is that two or more base stations are located within a range of 1 kilometer or less from the mobile terminal 1 and that the moving speed of the mobile terminal 1 is 30 kilometers per hour or less. When the second condition is satisfied, the processing device 40 may start Sigfox communication. Meanwhile, when the second condition is not satisfied, the processing device 40 may execute the processing of determining whether a third condition is satisfied or not. The third condition in FIG. 8 is that three or more base stations are located within a range of 2 kilometers or less from the mobile terminal 1 and that the moving speed of the mobile terminal 1 is 10 kilometers per hour or less. When the third condition is satisfied, the processing device 40 may start Sigfox communication. Meanwhile, when the third condition is not satisfied, the processing device 40 may execute the processing of determining whether a fourth condition is satisfied or not. When the fourth condition is satisfied, the processing device 40 may execute the processing of starting Sigfox communication. The fourth condition in FIG. 8 is that five or more base stations are located within a range of 4 kilometers or less from the mobile terminal 1 and that the moving speed of the mobile terminal 1 is 5 kilometers per hour or less.

(5) In the embodiment, the condition data D and the program P are separately stored in the storage device 30. However, the condition data D may be included in the program P. In the embodiment, the program P causing the processing device 40 to function as the specifying unit 410, the determination unit 420, and the communication control unit 430 is already stored in the storage device 30. However, the program P may be manufactured or distributed as it is. A method for distributing the program P may be writing and distributing the program into a computer-readable recording medium such as a flash ROM (read-only memory), or downloading and distributing the program via a telecommunications network such as the internet. Installing the program in a mobile terminal having a computer such as a CPU, the first communication device 10, and the second communication device 20 and then causing the computer of the mobile terminal to operate according to the program enables this mobile terminal to function as the mobile terminal according to the present disclosure.

(6) The specifying unit 410, the determination unit 420, and the communication control unit 430 in the embodiment software modules implemented by causing the processing device 40 to operate according to the program. However, a part or all of the specifying unit 410, the determination unit 420, and the communication control unit 430 may be implemented by hardware such as a DSP (digital signal processor), ASIC (application-specific integrated circuit), PLD (programmable logic device), or FPGA (field-programmable gate array). Even when a part or all of the specifying unit 410, the determination unit 420, and the communication control unit 430 are hardware, the same effects as in the embodiment are achieved.

(7) In the embodiment, the mobile terminal 1 according to an embodiment of the present disclosure has been described. However, a semiconductor IC executing the control method shown in FIG. 4, that is, a semiconductor IC having the specifying unit 410, the determination unit 420, and the communication control unit 430 may be manufactured or sold as it is. Incorporating this semiconductor IC into a mobile terminal having the first communication device 10 and the second communication device 20 enables this mobile terminal to function as the mobile terminal according to the present disclosure.

3. Form Grasped from at Least One of Embodiment and Modification Examples

The present disclosure is not limited to foregoing embodiment and modification examples and can be implemented in various other forms without departing from the spirit and scope of the present disclosure. For example, the present disclosure can be implemented in forms described below. A technical feature in the embodiment corresponding to a technical feature in the respective forms described below can be suitably replaced by or combined with another technical feature in order to solve a part or all of the problems of the present disclosure or in order to achieve a part or all of the effects of the present disclosure. The technical feature can be suitably deleted unless described as essential in this specification.

As a form of the mobile terminal, a mobile terminal having a communication module communicating according to a wireless communication standard such that an acknowledgement is not sent back even when data is received, includes a specifying unit, a determination unit, and a communication control unit described below. The specifying unit specifies a state of the mobile terminal. The determination unit determines whether the state specified by the specifying unit satisfies a predetermined condition or not. The communication control unit starts communication using the communication module, when the determination unit determines that the predetermined condition is satisfied. According to this form, the mobile terminal starts communication using the communication module only when the state of the mobile terminal is determined as satisfying the predetermined condition. Therefore, unnecessary communication can be avoided.

As a form of the mobile terminal, the state of the mobile terminal may include a moving speed of the mobile terminal, whether a location of the mobile terminal is indoor or not, and a distance from a destination of transmission of data from the mobile terminal and the mobile terminal. The predetermined condition may include a condition about at least one of the moving speed of the mobile terminal, whether the location of the mobile terminal is indoor or not, and the distance. This is because whether wireless communication becomes successful or not depends on the moving speed of the mobile terminal, whether the location of the mobile terminal is indoor or not, and the distance between the destination of transmission of data from the mobile terminal and the mobile terminal.

As a form of the mobile terminal, the predetermined condition may be that the moving speed is equal to or lower than a first threshold. According to this form, the mobile terminal can perform communication using the communication module, when the moving speed of the mobile terminal is equal to or lower than the first threshold. The first threshold corresponding to when the distance between the mobile terminal and the destination of transmission is long may be defined to be lower than the first threshold corresponding to when the distance between the mobile terminal and the destination of transmission is short.

As a form of the mobile terminal, the predetermined condition may be that the location is outdoor and that the moving speed is equal to or lower than a second threshold that is higher than the first threshold. According to this form, the mobile terminal can perform communication using the communication module, when the moving speed of the mobile terminal is equal to or lower than the second threshold, which is higher than the first threshold.

As a form of the mobile terminal, the predetermined condition may be that the distance is equal to or less than a third threshold and that the moving speed is equal to or lower than a fourth threshold that is higher than the first threshold. According to this form, the mobile terminal can perform communication using the communication module, when the distance between the mobile terminal and the destination of transmission is equal to or less than the third threshold and the moving speed of the mobile terminal equal to or lower than the fourth threshold, which is higher than the first threshold.

As a form of the mobile terminal, the destination of transmission may be a base station according to the wireless communication standard, and the predetermined condition may include a condition about a number of the base stations. This is because the probability of success in communication using the communication module becomes higher as the number of base stations within a predetermined distance range from the mobile terminal becomes greater.

As a form of the mobile terminal, the mobile terminal may include a positioning module that positions the mobile terminal, and the specifying unit may specify the moving speed, the location, and the distance, based on positioning using the positioning module. According to this form, the moving speed of the mobile terminal, whether the location of the mobile terminal is outdoor or indoor, and the distance between the destination of transmission and the mobile terminal can be specified, based on the result of the positioning by the positioning module.

As a form of the mobile terminal, the mobile terminal may include a storage device. Also, a timing of transmission of data from the mobile terminal may be predetermined. When the predetermined condition is not satisfied at the timing of transmission, the communication control unit may store the data in the storage unit and may transmit the data stored in the storage device, at a point when the predetermined condition is satisfied. According to this form, destruction of transmission target data at a timing of transmission when the state of the mobile terminal does not satisfy the predetermined condition can be avoided.

As a form of the semiconductor IC, a semiconductor IC controlling a communication module communicating according to a wireless communication standard such that an acknowledgement is not sent back even when data is received, includes a specifying unit, a determination unit, and a communication control unit. The specifying unit specifies a state of a communication device having the communication module. The determination unit determines whether the state specified by the specifying unit satisfies a predetermined condition or not. The communication control unit starts communication using the communication module, when the determination unit determines that the predetermined condition is satisfied. According to this form, the communication module starts communication when the state of the communication device having the communication module is determined as satisfying the predetermined condition. Therefore, unnecessary communication can be avoided.

As a form of the control method, a control method for a communication module communicating according to a wireless communication standard such that an acknowledgement is not sent back even when data is received, includes specifying processing, determination processing, and communication control processing. In the specifying processing, a state of a communication device having the communication module is specified. In the determination processing, whether the state specified in the specifying processing satisfies a predetermined condition or not. The communication control processing is executed when it is determined in the determination processing that the predetermined condition is satisfied. In the communication control processing, communication using the communication module starts. According to this form, the communication module starts communication when the state of the communication device having the communication module is determined as satisfying the predetermined condition. Therefore, unnecessary communication can be avoided.

What is claimed is:

1. A mobile terminal having a communication module communicating according to a wireless communication standard such that an acknowledgement is not sent back even when data is received, the mobile terminal comprising:
a central processing unit (CPU) configured to:
specify a state of the mobile terminal,
wherein the state of the mobile terminal includes a moving speed of the mobile terminal, whether a location of the mobile terminal is indoor or not, and a distance between a destination of transmission of data from the mobile terminal and the mobile terminal; and
determine whether the specified state satisfies a predetermined condition or not,
wherein the predetermined condition includes a condition about at least one of the moving speed of the mobile terminal is equal to or lower than a first threshold, whether the location of the mobile terminal is indoor or not, and the distance,
wherein a value of the first threshold is based on the distance between the destination of transmission of the data from the mobile terminal and the mobile terminal, and
wherein the value of the first threshold corresponding to when the distance is long is defined to be lower than the value of the first threshold corresponding to when the distance is short; and
a communication control unit configured to start communication using the communication module, when the CPU determines that the predetermined condition is satisfied.

2. The mobile terminal according to claim 1, wherein the predetermined condition is that the location is outdoor and that the moving speed is equal to or lower than a second threshold that is higher than the first threshold.

3. The mobile terminal according to claim 1, wherein the predetermined condition is that the distance is equal to or less than a third threshold and that the moving speed is equal to or lower than a fourth threshold that is higher than the first threshold.

4. The mobile terminal according to claim 1, wherein the destination of transmission is a base station according to the wireless communication standard, and the predetermined condition includes a condition about a number of base stations.

5. The mobile terminal according to claim 1, further comprising
a positioning module that positions the mobile terminal, wherein
the CPU is further configured to specify the moving speed, the location, and the distance, based on positioning using the positioning module.

6. The mobile terminal according to claim 1, further comprising
a storage device, wherein
a timing of transmission of data from the mobile terminal is predetermined, and when the predetermined condition is not satisfied at the timing of transmission, the communication control unit stores the data in the storage unit, and transmits the data stored in the storage device, at a point when the predetermined condition is satisfied.

7. A semiconductor IC controlling a communication module communicating according to a wireless communication standard such that an acknowledgement is not sent back even when data is received, the semiconductor IC comprising:
a central processing unit (CPU) configured to:
specify a state of a communication device having the communication module,
wherein the state of the communication device includes a moving speed of the communication device, whether a location of the communication device is indoor or not, and a distance between a destination of transmission of data from the communication device and the communication device; and
determine whether the specified state satisfies a predetermined condition or not,
wherein the predetermined condition includes a condition about at least one of the moving speed of the communication device is equal to or lower than a first threshold, whether the location of the communication device is indoor or not, and the distance,
wherein a value of the first threshold is based on the distance between the destination of transmission of the data from the communication device and the communication device, and
wherein the value of the first threshold corresponding to when the distance is long is defined to be lower than the value of the first threshold corresponding to when the distance is short; and
a communication control unit configured to start communication using the communication module, when the CPU determines that the predetermined condition is satisfied.

8. A control method for a communication module communicating according to a wireless communication standard such that an acknowledgement is not sent back even when data is received, the method comprising:
specifying a state of a communication device having the communication module,
wherein the state of the communication device includes a moving speed of the communication device, whether a location of the communication device is indoor or not, and a distance between a destination of transmission of data from the communication device and the communication device;
determining whether the specified state satisfies a predetermined condition or not,
wherein the predetermined condition includes a condition about at least one of the moving speed of the communication device is equal to or lower than a first threshold, whether the location of the communication device is indoor or not, and the distance,
wherein a value of the first threshold is based on the distance between the destination of transmission of the data from the communication device and the communication device, and
wherein the value of the first threshold corresponding to when the distance is long is defined to be lower than the value of the first threshold corresponding to when the distance is short; and
starting communication using the communication module, when it is determined that the predetermined condition is satisfied.

* * * * *